US008665326B2

(12) United States Patent
Matsuzaki

(10) Patent No.: US 8,665,326 B2
(45) Date of Patent: Mar. 4, 2014

(54) SCENE-CHANGE DETECTING DEVICE, COMPUTER READABLE STORAGE MEDIUM STORING SCENE-CHANGE DETECTION PROGRAM, AND SCENE-CHANGE DETECTING METHOD

(75) Inventor: Hiroshi Matsuzaki, Tachikawa (JP)

(73) Assignee: Olympus Corporation, Tokyo (JP)

(*) Notice: Subject to any disclaimer, the term of this patent is extended or adjusted under 35 U.S.C. 154(b) by 832 days.

(21) Appl. No.: 12/693,759

(22) Filed: Jan. 26, 2010

(65) Prior Publication Data
US 2010/0194869 A1 Aug. 5, 2010

(30) Foreign Application Priority Data

Jan. 30, 2009 (JP) .................................. 2009-020703
Jan. 30, 2009 (JP) .................................. 2009-020704

(51) Int. Cl.
*A62B 1/04* (2006.01)
(52) U.S. Cl.
USPC .......................................................... 348/65
(58) Field of Classification Search
USPC ............ 375/240.12–240.16; 348/65; 382/107
IPC ....................................................... A62B 1/04
See application file for complete search history.

(56) References Cited

U.S. PATENT DOCUMENTS

| 8,107,686 B2* | 1/2012 | Matsuda .......................... 382/107 |
| 8,243,790 B2* | 8/2012 | Leontaris et al. .......... 375/240.02 |
| 8,363,726 B2* | 1/2013 | Murabayashi et al. .. 375/240.16 |
| 2006/0034482 A1* | 2/2006 | Blonde et al. .................. 382/100 |
| 2009/0022400 A1 | 1/2009 | Matsuzaki |
| 2009/0278921 A1* | 11/2009 | Wilson ............................. 348/77 |

FOREIGN PATENT DOCUMENTS

| CN | 1691768 A | 11/2005 |
| EP | 2 008 571 A1 | 12/2008 |
| JP | 4-345382 | 12/1992 |
| JP | 11-252509 | 9/1999 |
| JP | 2007-195586 | 8/2007 |
| JP | 2009-011563 | 1/2009 |

OTHER PUBLICATIONS

Japanese Official Action dated Oct. 16, 2012 from related application JP 2009-020703 together with an English language translation.
Japanese Official Action dated Oct. 16, 2012 from related application JP 2009-020704 together with an English language translation.

* cited by examiner

*Primary Examiner* — Tung Vo
(74) *Attorney, Agent, or Firm* — Scully, Scott, Murphy & Presser, PC

(57) ABSTRACT

An image processing device includes a motion-vector detecting unit that detects motion vectors between an image and another image at a plurality of positions on the image, the image being at least a part of a plurality of images making up an image sequence; a pattern categorizing unit that categorizes the images into pattern groups each indicating a predetermined motion pattern, on the basis of the plurality of the motion vectors detected in the image; a group-based image-change detecting unit that detects, in each of the pattern groups, an image change between the images in the pattern group; and a group-based scene-change detecting unit that detects scene change in each of the pattern groups on the basis of the image change between the images in the pattern group.

20 Claims, 12 Drawing Sheets

SCENE-CHANGE DETECTING DEVICE, COMPUTER READABLE STORAGE MEDIUM STORING SCENE-CHANGE DETECTION PROGRAM, AND SCENE-CHANGE DETECTING METHOD

CROSS-REFERENCE TO RELATED APPLICATIONS

This application is based upon and claims the benefit of priority from Japanese Patent Application No. 2009-020703, filed on Jan. 30, 2009 and Japanese Patent Application No. 2009-020704, filed on Jan. 30, 2009, the entire contents of which are incorporated herein by reference.

BACKGROUND OF THE INVENTION

1. Field of the Invention

The present invention relates to a scene-change detecting device that detects a scene change position in an image sequence, a recording medium that stores therein a scene-change detection program that is readable by a computer, and a scene-change detecting method.

2. Description of the Related Art

Various technologies are disclosed that process an image sequence, such as a series of still images taken continuously or video images, and detect scene change positions in the image sequence. For example, a typical and well-known technology involves comparing a change in feature between adjacent images (adjacent frames) with a predetermined threshold and detecting, if the change is larger than the threshold, the change as a scene change position (see, for example, Japanese Laid-open Patent Publication No. 4-345382). The technology disclosed in Japanese Laid-open Patent Publication No. 4-345382 involves separating an image into blocks, detecting a motion vector for each block which is a small divided block, and, if motion vectors larger than a threshold are found and the number of the large motion vectors is a predetermined number or more, then detecting it as a scene change image.

SUMMARY OF THE INVENTION

A scene-change detecting device according to an aspect of the present invention includes a motion-vector detecting unit that detects motion vectors between an image and another image at a plurality of positions on the image, the image being at least a part of a plurality of images making up an image sequence; a pattern categorizing unit that categorizes the images into pattern groups each indicating a predetermined motion pattern, on the basis of the plurality of the motion vectors detected in the image; a group-based image-change detecting unit that detects, in each of the pattern groups, an image change between the images in the pattern group; and a group-based scene-change detecting unit that detects scene change in each of the pattern groups on the basis of the image change between the images in the pattern group.

A computer-readable storage medium according to another aspect of the present invention stores therein a scene-change detection program. The scene-change detection program includes instructions for causing a computer to execute detecting motion vectors between an image and another image at a plurality of positions on the image, the image being at least a part of a plurality of images making up an image sequence; categorizing the images into pattern groups each indicating a predetermined motion pattern, on the basis of the plurality of the motion vectors detected in the image; detecting, in each of the pattern groups, an image change between the images in the pattern group; and detecting scene change in each of the pattern groups on the basis of the image change between the images in the pattern group.

A scene-change detecting method includes detecting motion vectors between an image and another image at a plurality of positions on the image, the image being at least a part of a plurality of images making up an image sequence; categorizing the images into pattern groups each indicating a predetermined motion pattern, on the basis of the plurality of the motion vectors detected in the image; detecting, in each of the pattern groups, an image change between the images in the pattern group; and detecting scene change in each of the pattern groups on the basis of the image change between the images in the pattern group.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
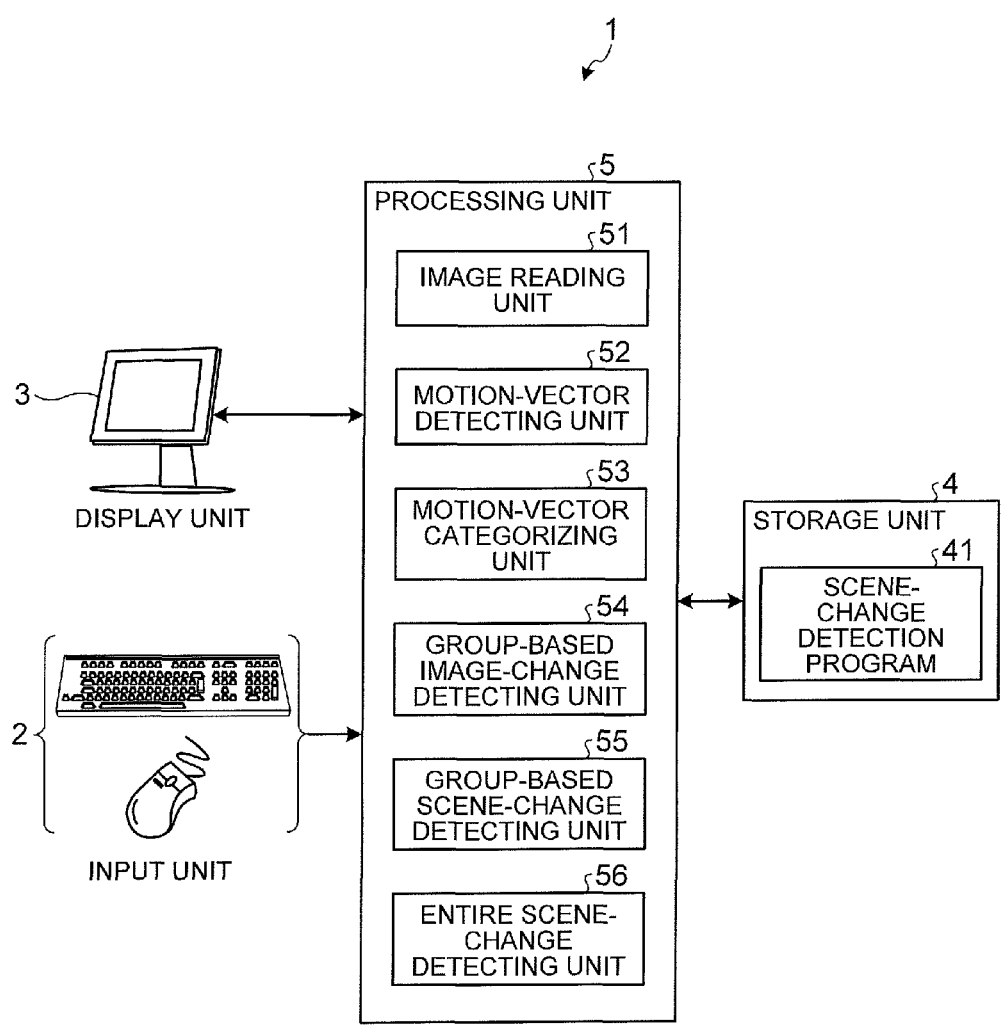
FIG. 1 is a block diagram of the functional configuration of a scene-change detecting device according to a first embodiment.

Exemplary embodiments of the present invention are described in detail below with reference to the accompanying drawings. It is noted that the present invention is not limited to these embodiments. The same parts are denoted with the same reference numerals in the drawings.

FIG. 1 is a block diagram of the functional configuration of a scene-change detecting device 1 according to a first embodiment. The scene-change detecting device 1 according to the first embodiment includes an input unit 2, a display unit 3, a storage unit 4, a processing unit 5 that has a control function for controlling components of the scene-change detecting device 1 and a computing function for performing various computing processes.

The input unit 2 is implemented by various input devices, for example, a keyboard, a mouse, a touch panel, and switches. The input unit 2 outputs an input signal to the processing unit 5 according to an input operation. The display unit 3 is implemented by a display device, for example, an LCD display, an EL display, or a CRT display. The display unit 3 displays various screens according to a display signal received from the processing unit 5.

The storage unit 4 is implemented by an information recording medium, a reading device that reads the information recording medium, etc. The information recording medium is, for example, various IC memories, such as a ROM or a RAM that is an updatable flash memory, a built-in hard disk, an external hard disk that is connected to the scene-change detecting device 1 via a data communication terminal, and a CD-ROM. The storage unit 4 stores therein computer programs that activates the scene-change detecting device 1 and implements various functions of the scene-change detecting device 1 and data that is used in the computer programs. The storage unit 4 stores therein, for example, data containing an image sequence that is made up with a plurality of images taken at different and continuous times (image information). Moreover, the storage unit 4 stores therein a scene-change detection program 41 that is used to detect a scene change position that is a position of scene change in the image sequence.

The processing unit 5 is implemented by a hardware component, such as a CPU. The processing unit 5 sends an instruction or data to the units of the scene-change detecting device 1 according to an operation signal received from the input unit 2, data stored in the storage unit 4, etc., thereby controlling the operation of the scene-change detecting device 1. The processing unit 5 includes an image reading unit 51, a motion-vector detecting unit 52, a motion-vector categorizing unit 53 that corresponds to a pattern categorizing unit, a group-based image-change detecting unit 54, a group-based scene change detecting unit 55, and an entire scene-change detecting unit 56 that corresponds to a scene change position detecting unit.

The image reading unit 51 reads the data containing the image sequence (image information) from the storage unit 4. The motion-vector detecting unit 52 associates the identical regions appearing on different images of the image sequence with each other and calculates a plurality of vectors indicative of the transition of the position of the identical regions (motion vectors). The motion-vector categorizing unit 53 categorizes each image of the image sequence into a pattern group on the basis of the detected motion vectors. The group-based image-change detecting unit 54 detects an image change between images of the image sequence using the result of the pattern-group categorization. More particularly, how the amount of the image change is calculated (hereinafter, "group-based image-change detecting process") is defined depending on each pattern group by the motion pattern. The group-based image-change detecting unit 54 calculates a change between an image to be processed and, for example, an adjacent image arranged in chronological order of shooting times using the group-based image-change detecting process corresponding to the motion pattern of the image to be processed and detects the calculated change as an image change between images of the pattern group. The group based scene-change detecting unit 55 detects scene changes in each pattern group on the basis of the change between images of the pattern group. More particularly, weighting information and a detection condition for a scene change image are predetermined depending on each pattern group by the motion pattern. The group-based scene-change detecting unit 55 extracts, from each of the pattern groups on the basis of the amount of image change that has been integrated with the weighting information that is predetermined depending on the motion pattern, scene change images that satisfy the detection condition corresponding to the motion pattern. The entire scene-change detecting unit 56 creates a scene-change-image sequence consisting of extracted scene change images. The created scene-change image sequence is displayed on, for example, the display unit in chronological shooting order.

Figure 2:
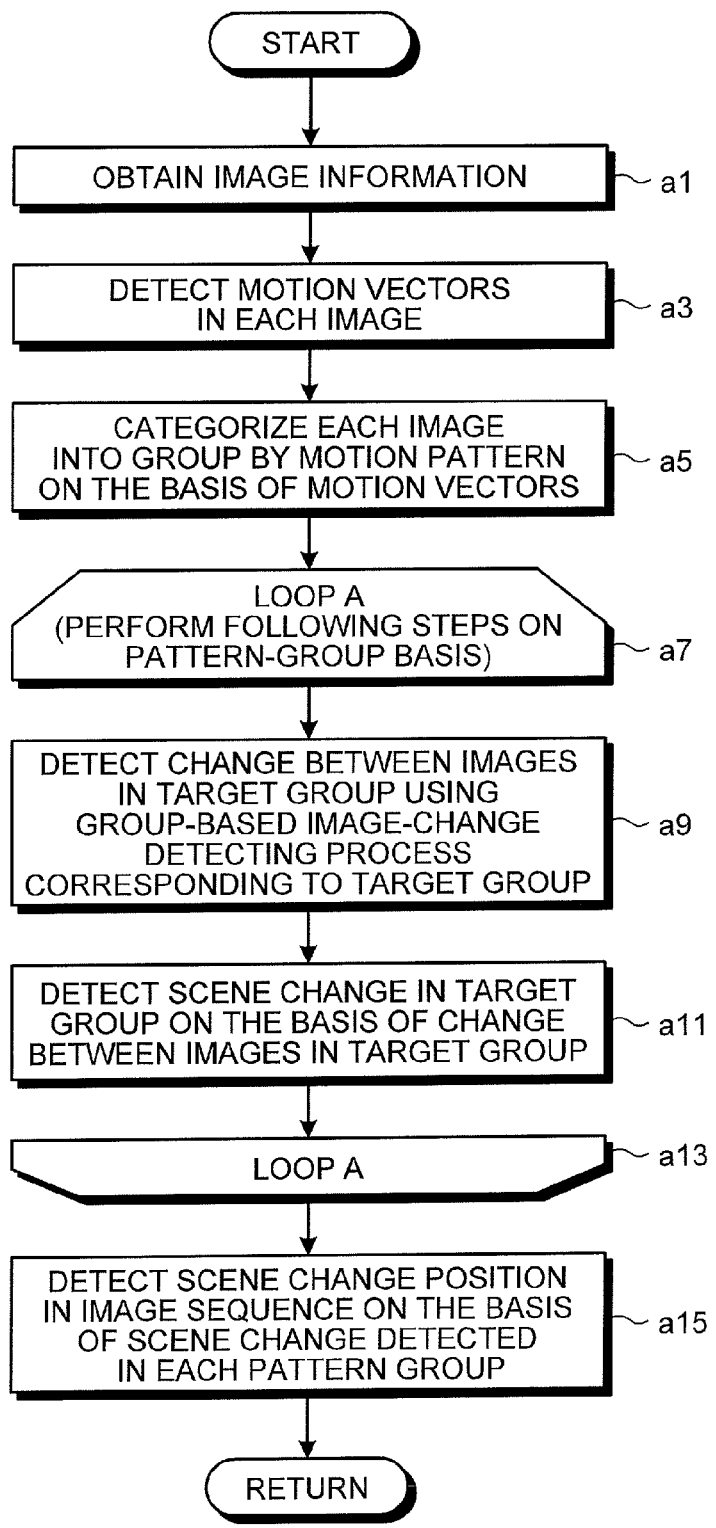
FIG. 2 is a flowchart of a process performed by the scene-change detecting device according to the first embodiment.

FIG. 2 is a flowchart of a process performed by the scene-change detecting device 1 according to the first embodiment. The process shown in FIG. 2 is implemented when the processing unit 5 reads the scene-change detection program 41 from the storage unit 4 and executes it.

The image reading unit 51 obtains information containing the image sequence from the storage unit 4 (Step a1).

After that, the motion-vector detecting unit 52 sequentially sets images of the image sequence one to be an image to be processed, and detects motion vectors (Step a3). Although various well-known techniques, such as template matching or optical flow calculation, can be used for calculation of the motion vector, a manner of calculating the motion vector using template matching is described below.

First, a predetermined number of regions that are located at different predetermined positions on an image that is arranged, in chronological shooting order, adjacent to the image to be processed are set as search regions. The positions and the number of search regions can be set as appropriate. One manner of setting the search regions involves, for example, separating the image into blocks in a lattice pattern and setting evenly distributed blocks as the search regions. Another manner involves searching for characteristic regions that have predetermined features and setting the characteristic regions as the search regions. For example, a region having a large degree of distribution of pixel values or a region that is determined on the basis of extracted edges to have a high edge strength can be set as the search regions. After the search regions are set, template matching is conducted, which involves selecting the search regions one by one as a template and searching the image to be processed for a region having the highest degree of matching with the template (the highest correlation value). As a result of the template matching, the region most similar to the search region is selected from the image to be processed and its correlation value is calculated. After that, the difference between the central coordinates of each search region and the central coordinates of the region corresponding to the search region is calculated as a motion vector, thereby calculating a group of motion vectors of the image to be processed. The motion-vector detecting unit 52 calculates the degree of reliability of each of the calculated motion vectors. For example, if no similar region is found or the calculated correlation value is low, the degree of reliability of the motion vector is set low. If the calculated correlation value is high, the degree of reliability of the motion vector is set high.

After that, the motion-vector categorizing unit 53 sequentially sets images of the image sequence to be processed and categorizes the selected image, on the basis of the detected group of the vector motions, into a pattern group by its motion pattern (Step a5). More particularly, the motion-vector categorizing unit 53 expects the motion of the visual field on the basis of the orientation characteristic of the detected group of the motion vectors, determines a motion pattern of the image on the basis of the expected motion of the visual field, and categorizes the image into a pattern group. In the present embodiment, the images are categorized into three pattern groups, i.e., "parallel shift", "motion away from target", and "motion toward target".

Figure 3:
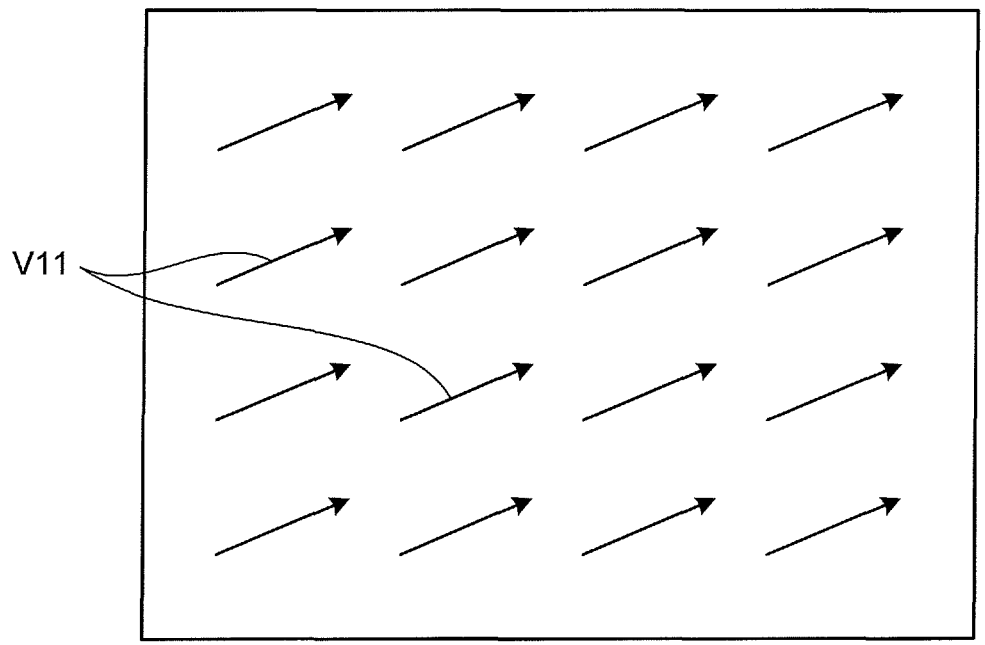
FIG. 3 is a schematic diagram of a group of motion vectors on an image that is categorized, by its motion pattern, into "parallel shift"

FIG. 3 is a schematic diagram of a group of motion vectors on an image that is categorized, by the motion pattern, into the "parallel shift". As shown in FIG. 3, motion vectors V11 that are detected in the image to be processed are aligned in substantially the same direction and have substantially the same length. In this case, it is expected that the view field is sliding side-to-side (shifting in parallel) between the image to be processed and the adjacent image arranged in chronological shooting order. In this case, the image is categorized into the "parallel shift" by the motion pattern. As for a categorizing process, for example, the direction of each of the motion vectors is determined. If all the motion vectors are aligned in substantially the same direction, a variance among the directions of the motion vectors is calculated. The calculated variance is compared with a predetermined threshold and, if the variance is smaller than the threshold, the image is categorized into the "parallel shift" by the motion pattern.

Figure 4:
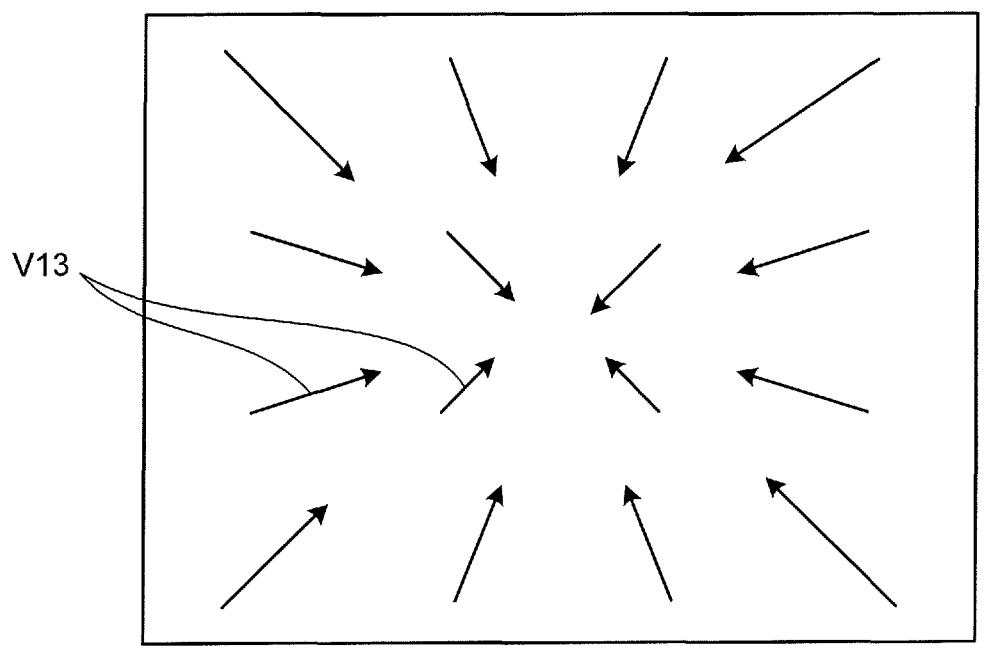
FIG. 4 is a schematic diagram of a group of motion vectors on an image that is categorized, by its motion pattern, into "motion away from target"

FIG. 4 is a schematic diagram of a group of motion vectors on an image that is categorized, by the motion pattern, into the "motion away from target". As shown in FIG. 4, motion vectors V13 that are detected in the image to be processed are aligned pointing toward a single point (the center) on the image. In this case, it is expected that the view field is moving away from the target between the image to be processed and the adjacent image arranged in chronological shooting order. When the view field is moving away from the target, the length of a motion vector decreases as it comes closer to the center as shown in FIG. 4. In this case, the image is categorized into the "motion away from target" by the motion pattern. As for a categorizing process, if, for example, the end points of the motion vectors are pointing toward a single point, the image is categorized into the "motion away from target" by the motion pattern.

Figure 5:
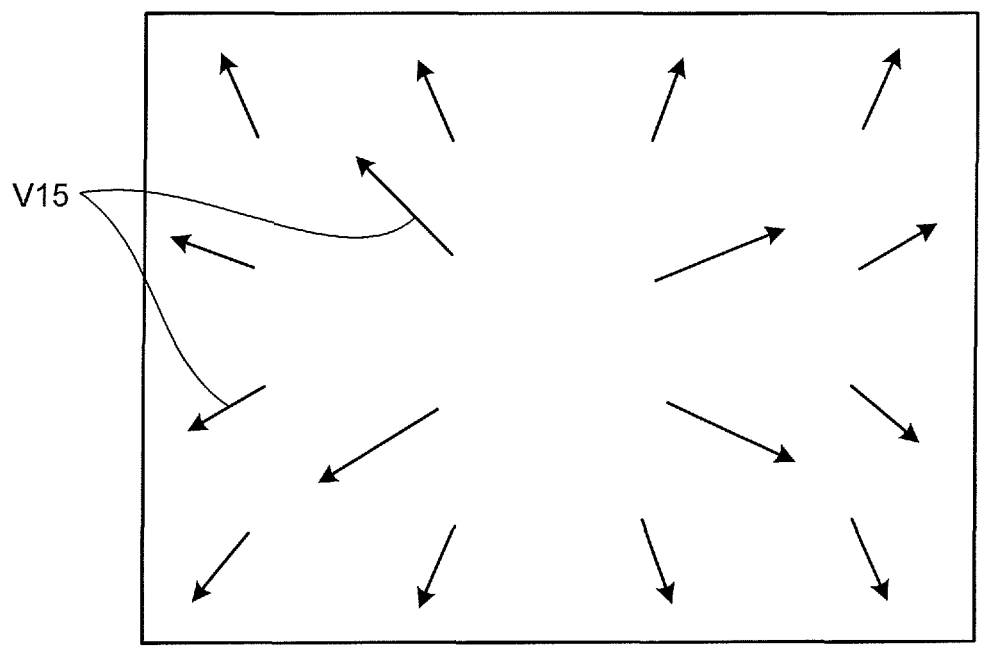
FIG. 5 is a schematic diagram of a group of motion vectors on an image that is categorized, by its motion pattern, into "motion toward target"

FIG. 5 is a schematic diagram of a group of motion vectors on an image that is categorized, by the motion pattern, into the "motion toward target". As shown in FIG. 5, motion vectors V15 that are detected in the image to be processed are aligned pointing outward from a single point (the center) on the image in a radial fashion. In this case, it is expected that the view field is moving closer to the target between the image to be processed and the adjacent image arranged in chronological shooting order. In the case where the view field is moving closer to the target, the length of a motion vector increases as it comes closer to the center. In this case, the image is categorized into the "motion toward target" by the motion pattern. As for a categorizing process, if, for example, the start points of the motion vectors are pointing toward a single point, the image is categorized into the "motion toward target" by the motion pattern.

The manner of pattern categorization is not limited to the above-described manner and, moreover, it is allowable to increase the number of groups. For example, images that are categorized into the "parallel shift" can be categorized into small groups with respect to the direction to which the view field is shifting. Moreover, images that are categorized into the "motion away from target" and the "motion toward target" can be categorized into small groups with respect to the position of the center. Furthermore, the motion patterns can be categorized into some groups other than the "parallel shift", the "motion away from target", and the "motion toward target". A detection condition for the motion pattern to be included in a pattern group can be set as appropriately.

After that, as shown in FIG. 2, a series of processes within a loop A is performed in such a manner that the pattern groups of motion patterns are selected one by one and each image included in the selected pattern group is subjected to the processes (Steps a7 to a13). In the processes within the loop A, a pattern group to be processed is called "target group".

During the processes within the loop A, the group based image-change detecting unit 54 calculates, according to a group-based image-change detecting process corresponding to the target group, for example, the amount of change between adjacent images arranged in chronological shooting order, thereby detecting the image change between the images of the target group (Step a9).

The group-based image-change detecting processes that are defined depending on the pattern groups are described below. As long as the correct motion vectors are detected, the lengths of the motion vectors work as indicators representing the image change between the images. The trend of the lengths of the motion vectors on each image is various according to the motion pattern. Therefore, a process of calculating the amount of image change on the basis of the lengths of the motion vectors and in accordance with the trend of the lengths of the motion vectors specified by each pattern group is defined as the group-based image-change detecting process depending on each pattern group. More particularly, a process of calculating the amount of image change using, for example, a parameter based on the lengths of the motion vectors is defined as the group-based image-change detecting process.

For example, as described above, the motion vectors on an image included in the "parallel shift" by the motion pattern are aligned in substantially the same direction and have substantially the same length Therefore, a process of calculating, for example, the average of the lengths of the motion vectors on the image as the amount of image change is defined as the group-based image-change detecting process corresponding to the "parallel shift".

Moreover, as described above, the lengths of the motion vectors on an image included in the "motion away from target" or "motion toward target" by the motion pattern are various depending on the distance away from the center. Therefore, a process of calculating, for example, the intermediate value, the maximum value, or the minimum value of the lengths of the motion vectors as the amounts of image change is defined as the group-based image-change detecting process corresponding to the "motion away from target" or the "motion toward target".

The group-based image-change detecting processes that are defined depending on the pattern groups are not limited to the above-described processes using a single parameter based on the lengths of the motion vectors. For example, such a process can be used that calculates a plurality of parameters on the basis of the lengths of the motion vectors and calculates the amount of image change integrated with the values of these parameters. Moreover, instead of a parameter based on the lengths of the motion vectors, a parameter based on the directions of the motion vectors or the like can be used. For example, a process of selecting two or more from the average, the intermediate value, the maximum value, and the minimum value of the lengths of the motion vectors, the variance of the directions of the motion vectors, the degree of reliability of each motion vector, etc., as appropriately and calculating the amount of image change integrated with the selected parameters can be used as a group-based image change detecting process.

Alternatively, it is allowable to calculate a degree of reliability of each motion vector as a parameter based on the motion pattern and calculate the amount of image change using the degree of reliability as a factor, which improves the reliability of the image-change detection. More particularly, the length or the direction of each motion vector is weighted by its degree of reliability. For example, the amount of image change can be calculated using the weighted average, the weighted intermediate value, the weighted maximum value, the weighted minimum value, etc., of the lengths of the motion vectors or the weighted variance, etc., of the directions of the motion vectors.

After that, the group-based scene-change detecting unit 55 detects, on the basis of the detected image change between the images of the target group, scene changes in the target group (Step a11). More particularly, the group based scene-change detecting unit 55 integrates the weighting information, which is predetermined corresponding to the target group, into the amount of image change of each image in the target group.

The weighting information is, for example, a weighting coefficient that is assigned to each pattern group. It is assumed that the weighting coefficient assigned to the "parallel shift" is set larger than the weighting coefficients assigned to the "motion away from target" and the "motion toward target". This is because, the speed of the target moving out of the view field observed in the motion pattern of the "parallel shift" is higher than the speeds of the target observed in the motion pattern of the "motion away from target" and the motion pattern of the "motion toward target", and a difference in the appearance of the target between adjacent images included in the "parallel shift" are small.

Figure 6:
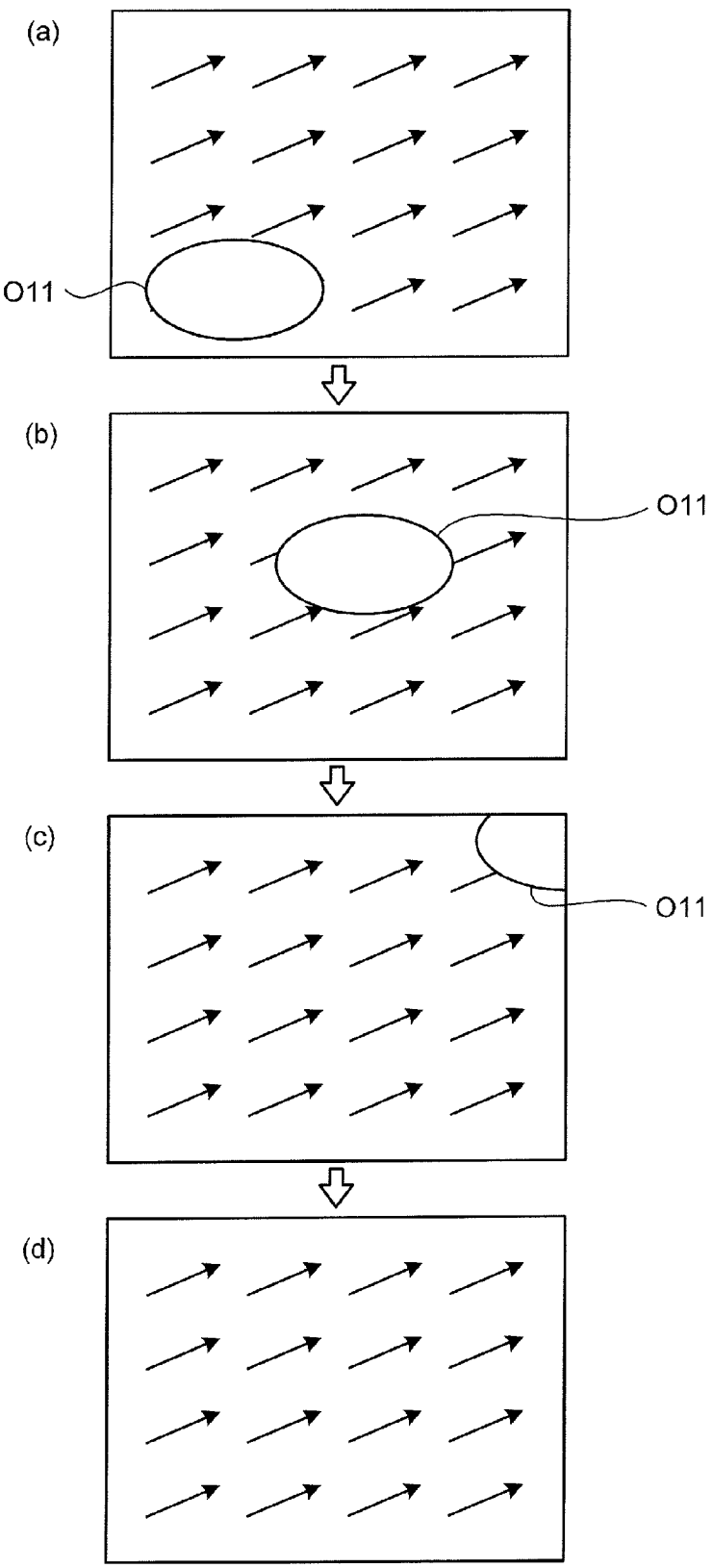
FIG. 6 is a schematic diagram of four successive images that are arranged in chronological shooting order and categorized into the "parallel shift" by the motion pattern.
Figure 7:
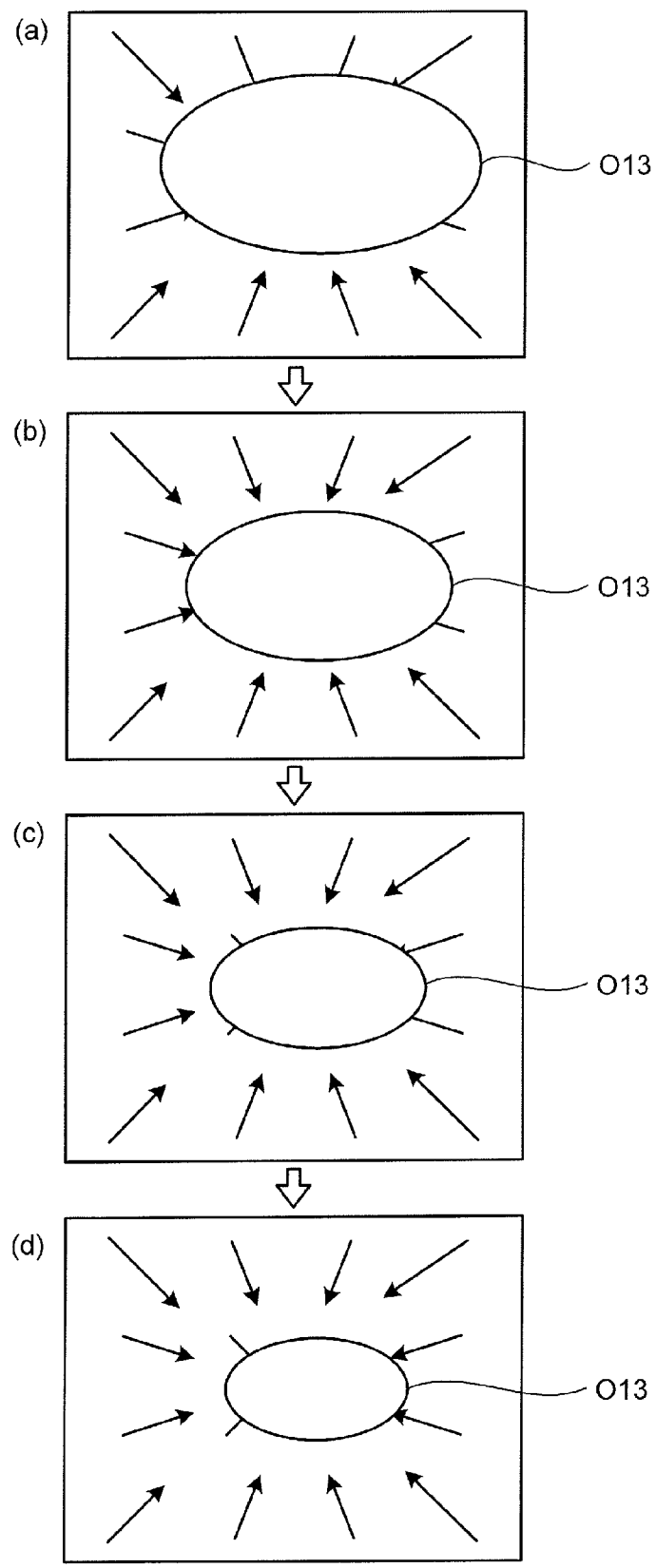
FIG. 7 is a schematic diagram of four successive images that are arranged in chronological shooting order and categorized into the "motion away from target" by the motion pattern.
Figure 8:
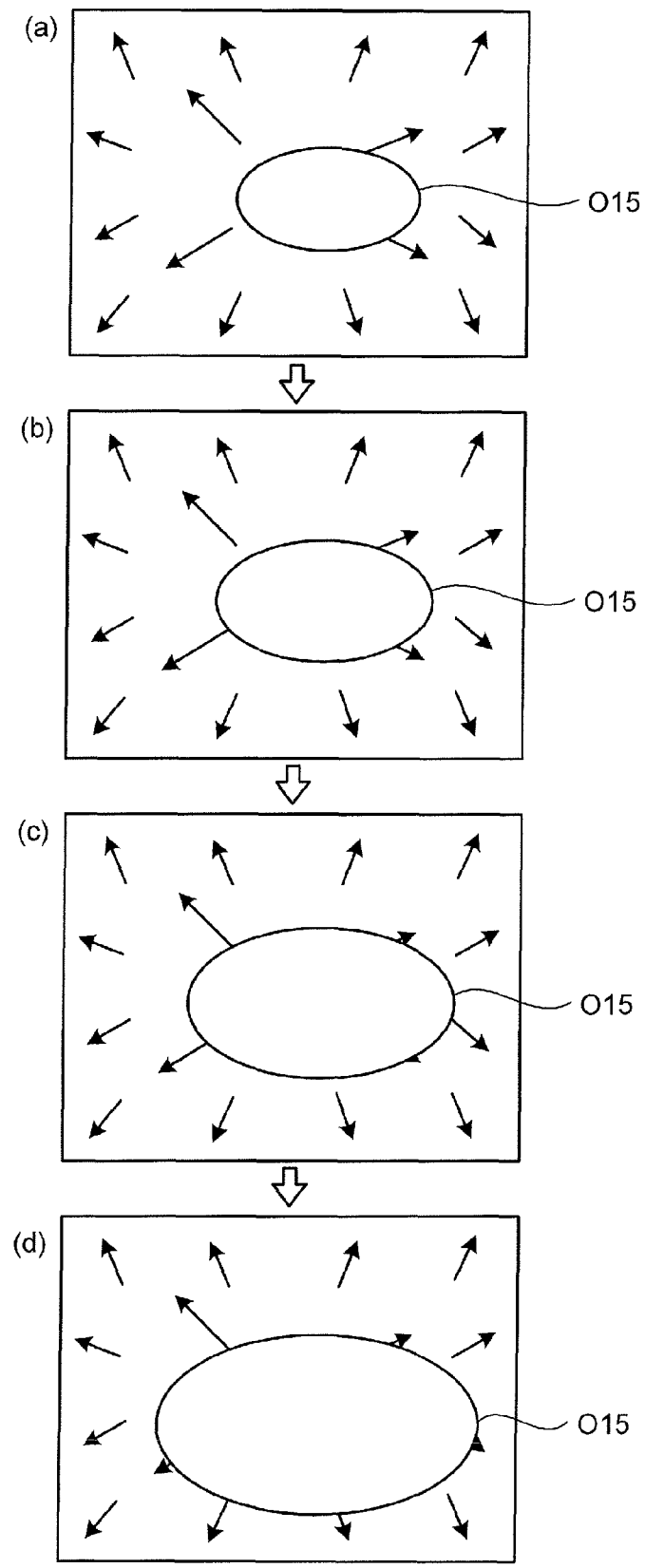
FIG. 8 is a schematic diagram of four successive images that are arranged in chronological shooting order and categorized into the "motion toward target" by the motion pattern.

FIG. 6 is a schematic diagram of four successive images (a) to (d) that are arranged in chronological shooting order and categorized into the "parallel shift" by the motion pattern. FIG. 6 illustrates the transition of the appearance of a target O11 appearing on these images. On each image, a group of motion vectors that has been detected in the image is illustrated. FIG. 7 is a schematic diagram of four successive images (a) to (d) that are arranged in chronological shooting order and categorized into the "motion away from target" by the motion pattern. FIG. 7 illustrates the transition of the appearance of a target O13 appearing on these images. On each image, a group of motion vectors that has been detected in the image is illustrated. FIG. 8 is a schematic diagram of four successive images (a) to (d) that are arranged in chronological shooting order and categorized into the "motion toward target" by the motion pattern. FIG. 7 illustrates the transition of the appearance of a target O15 appearing on these images. On each image, a group of motion vectors that has been detected in the image is illustrated.

As shown in FIGS. 6 to 8, when comparing the case of the "parallel shift" with the cases of the "motion away from target" and the "motion toward target", even if the lengths of the motion vectors are substantially the same, the transition of the appearance of the target appearing on the images and the speed of the target moving out of the view field are different. For example, the transition of the appearance of the target O11 in the case of the "parallel shift" shown in FIG. 6 is faster than the transition of the appearance of the target O13 in the case of the "motion away from target" shown in FIG. 7 or the transition of the appearance of the target O15 in the case of the "motion toward target" shown in FIG. 8; and the speed of the target O11 moving out of the view field is higher the speeds of the targets O13 and O15.

In the example of the "parallel shift" shown in FIG. 6, part of the target O11 is out of the view field of the third image (c) and the entire target O11 is out of the view field of the fourth image (d). In contrast, in the example of the "motion away from target", although the lengths of the motion vectors are substantially the same as the lengths of the motion vectors shown in FIG. 6, the target O13 still appears on the view field of the fourth image (d). It is clear that even if the amount of image change of an image included in the "parallel shift" is substantially the same as the amount of image change of an image included in the "motion away from target" or the "motion toward target", the motion of the target in the "parallel shift" is larger than the motion of the target in the "motion away from target" or the "motion toward target". The same conclusion is led from the example shown in FIG. 8, that is, it is assumed that the degree of importance of the "parallel shift" is higher than the degrees of importance of the "motion away from target" and the "motion toward target".

Accordingly, in the first embodiment, the weighting coefficient of the "parallel shift" is set higher than the weighting coefficients of the "motion away from target" and the "motion toward target". The weighting coefficient is then integrated into the amount of image change. With this configuration, the image change integrated with the degree of importance calculated based on the pattern-group-based transition of the appearance of the target is detected. Moreover, because the weighting information corresponding to the pattern group is integrated into the amount of image change, the sequence of the pattern groups is determined by not the single factor, i.e., the motion pattern but two different factors that include the motion pattern and the weighting coefficient, which results in an appropriate sequence of the pattern groups.

More particularly, the group-based scene-change detecting unit 55 calculates the amount of image change integrated with the weighting information using the following equation (1), thereby detecting the image change between images. In Equation (1), ImgMov(j) is the amount of image change of a j-th image included in the image sequence, and $W_{imgMov(k)}$ is the weighting coefficient assigned to a k-th pattern group as the weighting information.

$$ImgMov(j)'=W_{ImgMov(k)}ImgMov(j) \quad (1)$$

After that, the group-based scene-change detecting unit 55 extracts, by the amount of image change integrated with the weighting information, an image that satisfies a detection condition for the scene change that is predetermined corresponding to the target group (hereinafter, "scene change image"), thereby detecting the scene changes in the target group. It is noted that the detection condition for the scene change image is expressed by, for example, a threshold in such a manner that the threshold varies depending on the pattern groups. The group-based scene-change detecting unit 55 compares the amount of image of each image included in the target group with the threshold assigned to the target group and extracts an image having an amount of image change larger than the threshold as the scene change image. The threshold is set according to the degree of importance of the pattern group in such a manner that the threshold of a pattern group having a low degree of importance is set larger than the threshold of a pattern group having a high degree of importance.

Although the manner of setting the pattern-group-based threshold as the detection condition for the scene change image and comparing the amount of image change with the threshold is descried above, some other manners can be used. For example, it is allowable to decide the number of scene changes to be detected in each of the pattern groups. For example, the number of scene changes to be detected in a pattern group having a high degree of importance is set larger than the number of scene changes to be detected in a pattern group having a low degree of importance. The group-based scene-change detecting unit 55 extracts the predetermined number of images having the largest amounts of image change as the scene change images, thereby detecting the scene changes.

When all the pattern groups of the motion pattern have been subjected to the processes within the loop A, the entire scene-change detecting unit 56 creates a scene change-image sequence of each pattern group so that the scene-change-image sequence includes the scene change images detected at Step a11, thereby detecting the scene change positions in the entire image sequence (Step a15).

Figure 9:
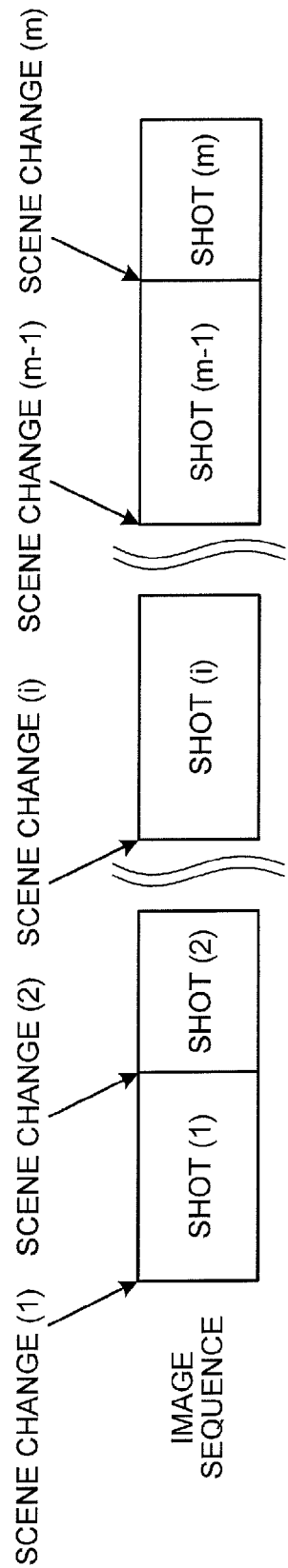
FIG. 9 is a schematic diagram of an image sequence with detected scene change images.

FIG. 9 is a schematic diagram of an image sequence with detected scene change images. The image sequence that has been processed in the above-described manner is, as shown in FIG. 9, separated into a plurality of shots by the scene changes indicated by the scene change images. The display unit 3 sequentially displays the scene change images that are the top image of each shot. Images having small amounts of image change between images are not displayed. In other words, images having high degrees of similarity are skipped. Accordingly, effective display of images of the image sequence is implemented.

Moreover, according to the first embodiment, images of an image sequence are categorized into pattern groups by the motion pattern, and the image change between images is detected in each pattern group in a manner corresponding to the pattern group. More particularly, a group-based image change detecting process is defined depending on the pattern group, and the change between images is detected in accordance with the group-based image-change detecting process corresponding to the pattern group. In this manner, scene changes are detected in each pattern group on the basis of the image change between the images included in the pattern group. More particularly, scene changes are detected in each of the pattern groups by integrating the amount of image change calculated for each image with the weighting information corresponding to the pattern group, and then extracting scene change images from a pattern group on the basis of, the detection condition corresponding to the pattern group. Accordingly, the image change between images is detected in each pattern group in a manner corresponding to the pattern group, and the scene change is detected in each pattern group in a manner corresponding to the pattern group. In this manner, the scene change position is detected the image sequence in an appropriate manner corresponding to each of the pattern groups, which improves the accuracy in the detection.

Moreover, even if the apparent lengths of motion vectors are the same, it is highly possible that the actual amounts of motion in the "parallel shift", the "motion away from target" and the "motion toward target" are different from each other. In the first embodiment, highly accurate scene change detection is conducted using the weighting information and the detection condition that are defined depending on each pattern group of the motion vectors.

Although, in the above-described example, the image change between images is detected on the basis of the motion vectors that have been detected for adjacent images arranged in chronological shooting order with each other, the manner of detecting the change between images is not limited thereto. The image change between images can be detected using, for example, a well-known feature amount, such as a correlation between images, an SSD (sum of squared differences of pixels), and a SAD (sum of absolute differences of pixels).

The motion vectors can be detected in some other manners without processing two adjacent images. For example, it is allowable to calculate feature amounts between two or more images and detect the image change between images by statistical calculation using a combination of the calculated feature amounts. For example, as for each of several adjacent images, various feature amounts, such as the motion vector between the image and another image adjacent to the image, a normalized cross-correlation value, an SSD, a SAD, etc., are calculated. The image change between images is detected on the basis of the average of these values.

Some image sequences include similar images arranged adjacent to each other. In such image sequences, the result of the processing with a similar image can be used as the result of the processing with another similar image. As a simple manner using the above technique for deciding the number of images, a predetermined fixed number of images is decided. Alternatively, it is allowable to decide it as appropriately by comparing the degree of similarity between images with a predetermined threshold. Because it is unnecessary to process all the images of the image sequence, the processing time is reduced.

A second embodiment is described below. In the first embodiment, each image of an image sequence is categorized by the motion pattern into any of the "parallel shift", the "motion away from target", and the "motion toward target". The image change between images and the scene change are detected in each of the pattern groups. However, an actual image sequences includes an image that is not categorized into any of the "parallel shift", the "motion away from target", and the "motion toward target", such as an image that is completely different due to a scene change. In the second embodiment, such an image is categorized into a new group (hereinafter, "scene change group") and is then subjected to a process different from the process of detecting the image change between images on the basis of the motion vectors described in the first embodiment.

Figure 10:
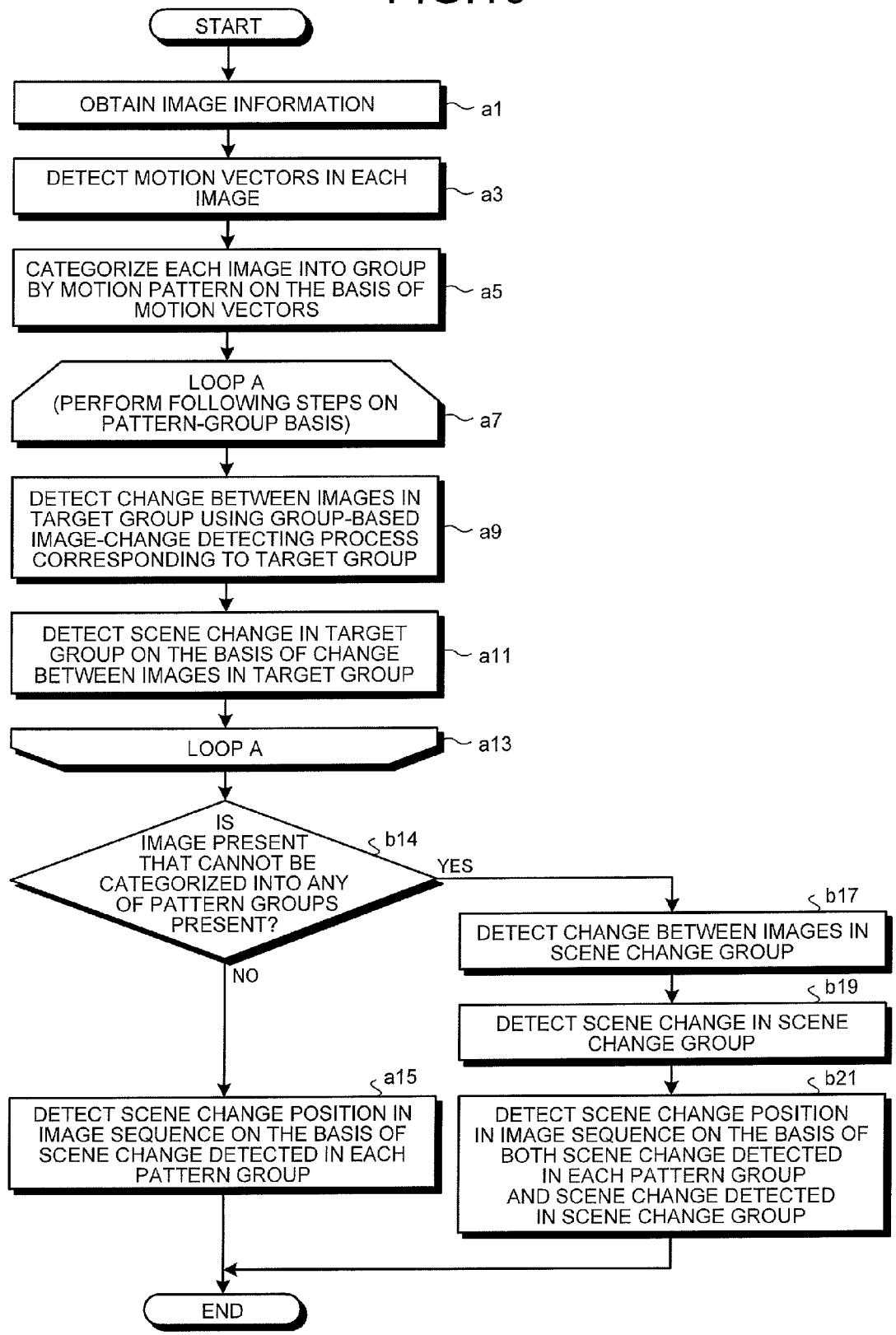
FIG. 10 is a flowchart of a process performed by a scene-change detecting device according to a second embodiment.

FIG. 10 is a flowchart of a process performed by a scene-change detecting device according to the second embodiment. Steps the same as those in the process performed in the first embodiment are denoted with the same reference numerals.

As shown in FIG. 10, after the processes within the loop A, the motion-vector categorizing unit 53 determines whether an image that is not categorized into any of the "parallel shift", the "motion away from target", and the "motion toward target" is present. It is expected that the image that is not categorized into the motion patterns is assumed be an image with a low degree of reliability, such as an image that has less regions selected corresponding to the search regions for the calculation of the motion vectors and an image that has the calculated motion vectors lack of unified direction. Such an image has a large image change between images and is assumed to be an image that is completely different due to scene change. If no image is present that is not categorized into any of the motion patterns (Step b14: No), the process control goes to Step a15. After that, the entire scene-change detecting unit 56 creates a scene-change-image sequence that includes the scene change images that have been detected at Step a11 in each pattern group, thereby detecting scene changes in the entire image sequence.

If an image is present that is not categorized into any of the motion patterns (Step b14: Yes), the image is categorized into the scene change group. The group-based image-change detecting unit 54 detects the image change between images of the scene change group in a manner different from the manner of detecting the image change on the basis on the motion vectors (Step b17). More particularly, the group-based image-change detecting unit 54 detects the image change between the images using a feature amount indicated by, for example, a correlation between images, an SSD, and a SAD.

After that, the group-based scene-change detecting unit 55 detects the scene change in the scene change group in the same manner as in Step a11 (Step b19). More particularly, the weighting information and the detection condition are predetermined corresponding to the scene change group. The group-based scene-change detecting unit 55 extracts, from each pattern group on the basis of the amount of image change of each image included in the scene change group integrated with the weighting information corresponding to the scene change group, an image that satisfies the detection condition corresponding to the scene change group as the scene change image, thereby detecting the scene changes in each pattern group. For example, because, as described above, an image included in the scene change group is expected to have a large image change between images, a weighting coefficient larger than the weighting coefficient of the "parallel shift", the "motion away from target", and the "motion toward target" is set as the weighting information. If the detection condition is expressed by a threshold, the threshold is set smaller than the threshold of the "parallel shift", the "motion away from target", and the "motion toward target".

The entire scene-change detecting unit 56 creates a scene-change-image sequence that includes both the scene change images detected at Step a11 in each pattern group and the scene change images detected in the scene change group at Step b19, thereby detecting scene changes in the entire image sequence (Step b21). It is assumed, as described above, that the correct motion vectors are detected in images categorized into the pattern groups and, therefore, the image change of images categorized into the pattern groups is smaller than the image change of images that are not categorized any of the pattern groups. Therefore, it is possible to adjust the maximum value of the image change of images that are categorized into the pattern groups and the minimum value of the image change of a group of images that are not categorized into any of the pattern groups to become continuous values.

The second embodiment brings the same effects as in the first embodiment. Moreover, an image change between the images that are included, because they are not categorized into any of the motion patterns, in the scene change group is detected in a manner different from the manner of detecting the image change using the motion vectors and scene changes are detected in the scene change group on the basis of the detected image change between the images. With this configuration, even if an image sequence includes an image that cannot be categorized into any of the pattern groups, the image change between the images is calculated in an appropriate manner. Accordingly, scene change positions are detected in the image sequence in an appropriate manner, which improves the accuracy in the detection.

The scene-change detecting devices according to the first embodiment and the second embodiment can be implemented when a computer system, such as a personal computer or a work station, executes a predetermined computer program. A computer system that has the same functions as in the scene-change detecting devices according to the first embodiment and the second embodiment and executes a scene-change detection program is described below.

Figure 11:
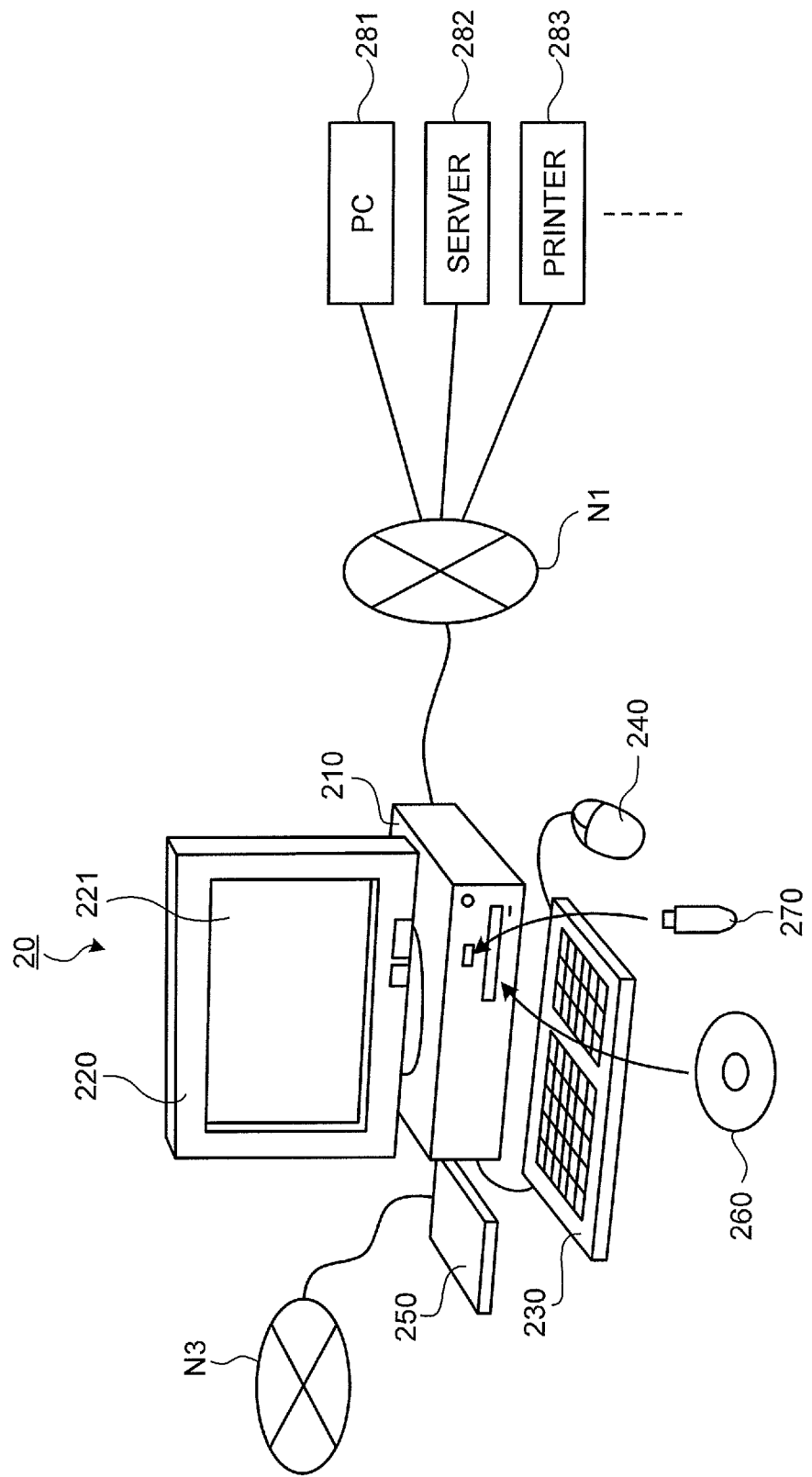
FIG. 11 is a schematic diagram of the configuration of a computer system used in the embodiments.

FIG. 11 is a schematic diagram of the configuration of a computer system 20 used in the embodiments. FIG. 11 is a block diagram of a main unit 210 included in the computer system 20. As shown in FIG. 11, the computer system 20 includes the main unit 210 and a display 220 that displays information, such as images, on a display screen 221 under an instruction received from the main unit 210. The computer system 20 further includes a keyboard 230 with which various information is input to the computer system 20 and a mouse 240 with which an arbitrary position on the display screen 221 of the display 220 is specified.

Figure 12:
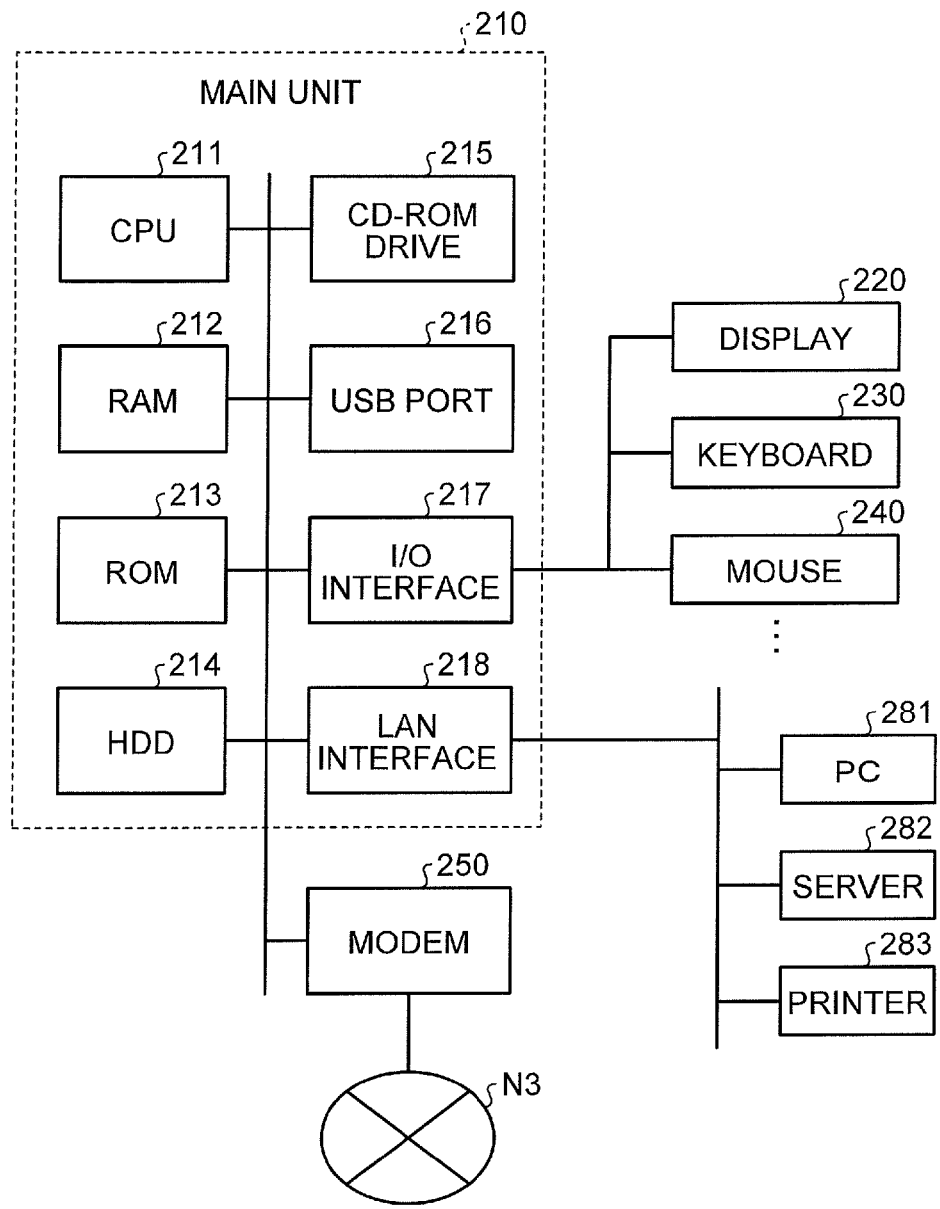
FIG. 12 is a block diagram of a main unit included in the computer system shown in FIG. 11.

The main unit 210 included in the computer system 20, as shown in FIG. 12, includes a CPU 211, a RAM 212, a ROM 213, a hard disk drive (HDD) 214, a CD-ROM drive 215 that receives a CD-ROM 260, a USB port 216 that connects a USB memory 270 to the computer system 20 in a detachable manner, an I/O interface 217 that connects the display 220, the keyboard 230, and the mouse 240 to the computer system 20, and a LAN interface 218 that connects the computer system 20 to a local area network/wide area network (LAN/WAN) N1.

The computer system 20 is connected to a modem 250 that allows the computer system 20 to connect to a public line N3, such as the Internet, and is connected to external devices, such as a personal computer (PC) 281, a server 282, and a printer 283, via the LAN interface 218 and the LAN/WAN N1.

The computer system 20 reads the scene-change detection program from a predetermined recording medium and executes the scene-change detection program, thereby implementing the scene-change detecting device. Not limited to the CD-ROM 260 and the USB memory 270, the predetermined recording medium is implemented by any types of recording mediums that stores therein the scene-change detection program in the form readable by the computer system 20, such as "movable physical media" that include an MO disk, a DVD disk, a flexible disk (FD), a magnet-optical disk, and an IC card, "stationary physical media" that include built-in or external devices that are connected to the computer system 20, such as the HDD 214, the RAM 212, and the ROM 213, and "communication media" that are used as temporal memories of the computer program and include the public line N3 that is connected to the computer system 20 via the modem 250, the external computer system (PC) 281, the LAN/WAN N1 that is connected to the server 282, and etc.

The scene-change detection program is stored in a recording medium that is a movable physical medium, a stationary physical medium, a communication medium, or the like in the form readable by the computer. The computer system 20 reads the scene-change detection program from the recording medium and executes the read scene-change detection program, thereby implementing the scene-change detecting device. The device that executes the scene change detection program is not limited to the computer system 20 and some other devices, such as the external computer system (PC) 281 or the server 282 can be configured to execute the scene-change detection program. Moreover, it is allowable for two or more of these devices to execute the scene-change detection program together.

Figure 13:
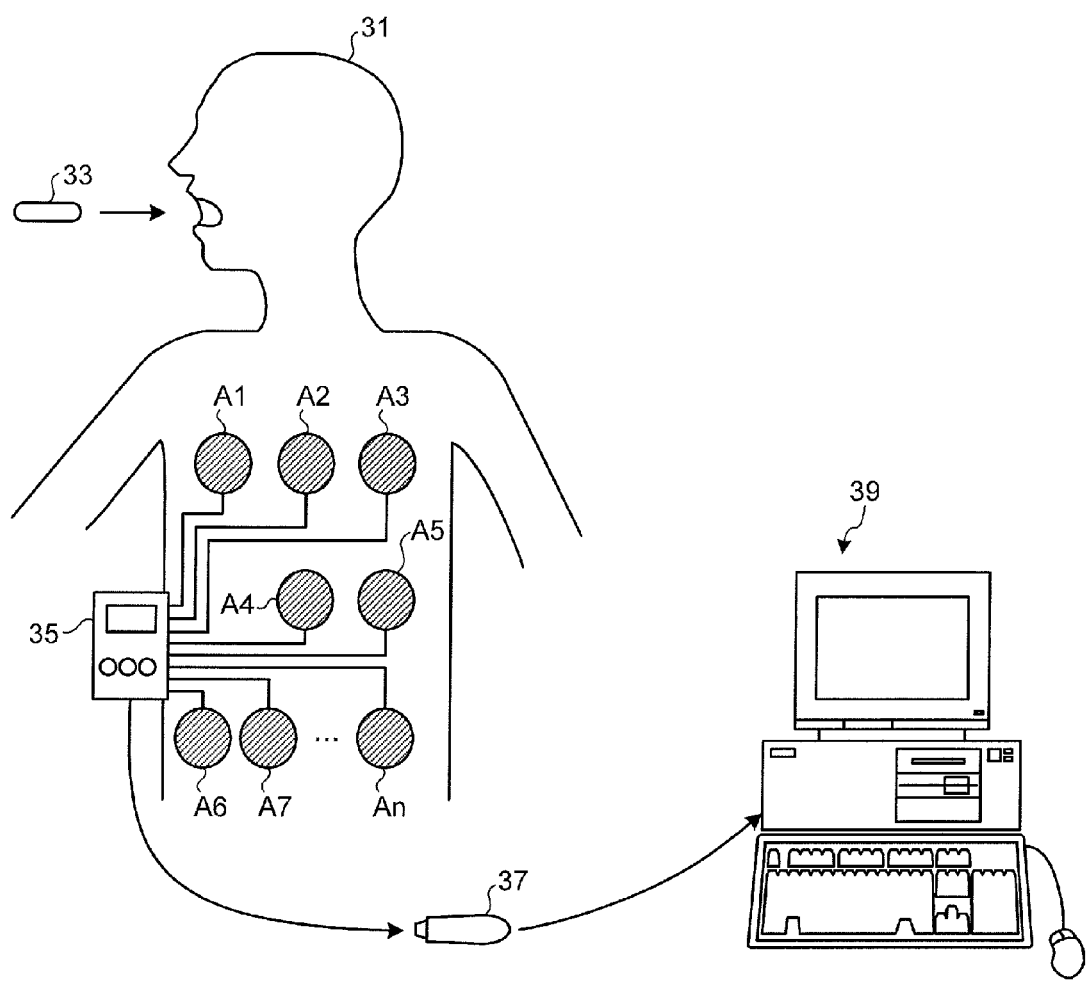
FIG. 13 is a schematic diagram of a capsule endoscope system that includes a scene-change detecting device.

The above-described scene-change detecting devices according to the first embodiment and the second embodiment can be used in, for example, a capsule endoscope system. FIG. 13 is a schematic diagram of a capsule endoscope system that includes a scene-change detecting device 39 capable of implementing the first embodiment or the second embodiment. The scene-change detecting device 39 is a general-purpose computer, such as a workstation or a personal computer. As shown in FIG. 13, the capsule endoscope system includes the scene-change detecting device 39, a capsule endoscope 33 that takes images of an inner part of a subject 31 (hereinafter, "in-vivo images"), a receiving device 35 that wirelessly receives the in-vivo images from the capsule endoscope 33, etc. To transfer image data between the receiving device 35 and the scene change detecting device 39, for example, a recording medium that can be carried (portable recording medium) 37 is used. The portable recording medium 37 corresponds to the storage unit 4 shown in FIG. 1.

The capsule endoscope 33 has an imaging function and a wireless communication function, etc. The capsule endoscope 33 is swallowed through the mouth of the subject 31 and then introduced inside the subject 31. During the time until it is discharged out of the body, the capsule endoscope 33 sequentially takes as many as about 60 thousands images in each 0.5 second, while moving inside the body cavity in accordance with the peristaltic motion or the like, and wirelessly sends the taken in-vivo images outside the body.

The receiving device 35 includes a plurality of receiving antennas A1 to An arranged at different points on the body surface along the passage of the capsule endoscope 33 moving inside the subject 31. The receiving device 35 receives image data wirelessly from the capsule endoscope 33 via the receiving antennas A1 to An. The receiving device 35 is configure to attach to or detach from the portable recording medium 37 and sequentially stores the received image data in the portable recording medium 37. In this manner, the in-vivo images of the inner part of the subject 31 taken by the capsule endoscope 33 are stored in the portable recording medium 37 arranged in chronological order as an image sequence.

The scene-change detecting device 39 is configured to attach to or detach from the portable recording medium 37. The scene-change detecting device 39 processes an image sequence that contains the in-vivo images that has been received by the receiving device 35 and stored in the portable recording medium 37, and sequentially displays the processed images on a display, such as an LCD or an ELD. The scene-change detecting device 39 detects scene change positions in the image sequence of the in-vivo images in the same manner as the scene-change detecting devices according to the first embodiment and the second embodiment detects, thereby creating the scene-change-image sequence.

The speed of the capsule endoscope 33 moving inside the body cavity is not constant and chronological change of taken images is various. Due to this, it is possible for an image sequence of in-vivo images to be processed to include similar successive images. If all the in-vivo images that are taken by the capsule endoscope 33 are displayed, an observer, for example, a doctor have to spend a long time to check all the in-vivo images as many as about 60 thousands, which increases the load of the observer. Therefore, the process of processing individual in-vivo images, detecting scene change positions in the image sequence, and creating the scene-change-image sequence enables an observer to check the outline of the image sequence in an effective manner by skipping similar images. Accordingly, this is effective to reduce the load of the observer.

The capsule endoscope system can detect appropriate scene change positions in an image sequence that includes many in-vivo images taken by the capsule endoscope 33, which allows an effective check by an observer and, therefore, contributes to effective diagnosis. Especially, in-vivo images taken by the capsule endoscope 33 includes many images that cannot be categorized into any of the motion patterns. Therefore, as described in the second embodiment, it is important to detect the image change between images that cannot be categorized into any of the pattern groups. If the scene-change detecting device according to the second embodiment is used in this capsule endoscope system, more appropriate scene change positions are detected.

Although the case where an image sequence of in-vivo images taken by the capsule endoscope is described above, the technology is suitable for detecting scene changing points in an image sequence and displaying only images that show great scene changes.

According to the present invention, an image change between images is detected in each pattern group, and then scene changes are detected in each pattern group on the basis of the image change between images. With this configuration, appropriate scene change positions are detected in the image sequence in a manner corresponding to the pattern group, which improves the efficiency of the detection.

The above and other features, advantages and technical and industrial significance of this invention will be better understood by reading the following detailed description of presently preferred embodiments of the invention, when considered in connection with the accompanying drawings.

What is claimed is:

1. A scene-change detecting device comprising:
    a motion-vector detecting unit that detects motion vectors between an image and another image at a plurality of positions on the image, the image being at least a part of a plurality of images making up an image sequence;
    a pattern categorizing unit that categorizes the images into pattern groups each indicating a predetermined motion pattern, on the basis of the plurality of the motion vectors detected in the image;
    a group-based image-change detecting unit that detects an image change between the images in each of the pattern groups categorized by the pattern categorizing unit; and
    a group-based scene-change detecting unit that detects scene change in each of the pattern groups categorized by the pattern categorizing unit, on the basis of the image change detected by the group-based image-change detecting unit.

2. The scene-change detecting device according to claim 1, wherein
    weighting information is predetermined depending on each of the pattern groups, and
    the group-based scene-change detecting unit detects the scene change in each of the pattern groups by integrating the weighting information corresponding to a pattern group into the image change between images in the pattern group.

3. The scene-change detecting device according to claim 2, wherein the weighting information is set in accordance with a degree of importance that is predetermined depending on each of the pattern groups.

4. The scene-change detecting device according to claim 1, wherein
    a detection condition is predetermined depending on each of the pattern groups, and
    the group-based scene-change detecting unit detects the scene change in each of the pattern groups by determining whether the image change between the images in the pattern group satisfies the detection condition corresponding to the pattern group.

5. The scene-change detecting device according to claim 4, wherein
    the detection condition is expressed by a threshold defined depending on each of the pattern groups, and
    the group-based image-change detecting unit calculates an amount of image change of the image using one or more parameters calculated using the plurality of the motion vectors detected in the image, and
    the group-based scene-change detecting unit extracts a scene change image from each of the pattern groups by comparing the amount of image change of each image in a pattern group with the threshold corresponding to the pattern group.

6. The scene-change detecting device according to claim 4, wherein
the detection condition is expressed by the number of scene changes defined depending on each of the pattern groups, and
the group-based scene-change detecting unit extracts scene change images from images of each of the pattern groups in accordance with the number of scene changes corresponding to the pattern group.

7. The scene-change detecting device according to claim 4, wherein the detection condition is predetermined in accordance with a degree of importance that is defined depending on each of the pattern groups.

8. The scene-change detecting device according to claim 1, wherein the pattern categorizing unit categorizes the images into the pattern groups, each motion pattern being determined on the basis of statistical data based on the plurality of the motion vectors detected in the image or distribution of the motion vectors detected in the image, wherein the pattern groups include parallel shift, motion away from target, and motion toward target.

9. The scene-change detecting device according to claim 1, wherein the group-based image-change detecting unit detects the image change between images in each of the pattern groups using a group-based image-change detecting process that is defined depending on each of the pattern groups.

10. The scene-change detecting device according to claim 9, wherein the group-based image-change detecting process that is defined depending on each of the pattern groups is a process for calculating an amount of image change of the image using one or more parameters based on the plurality of the motion vectors that have been detected in the image.

11. The scene-change detecting device according to claim 9, wherein the pattern categorizing unit categorizes the images into the pattern groups, each motion pattern being determined on the basis of statistical data based on the plurality of the motion vectors detected in the image or distribution of the motion vectors detected in the image, wherein the pattern groups include parallel shift, motion away from target, and motion toward target.

12. The scene-change detecting device according to claim 11, wherein the group-based image-change detecting process that is used for an image that is categorized by its motion pattern into the parallel shift is a process for calculating an amount of image change of the image using one or more parameters based on the plurality of the motion vectors that have been detected in the image.

13. The scene-change detecting device according to claim 11, wherein the group-based image-change detecting process that is used for an image that is categorized by its motion pattern into the motion away from target or the motion toward target is a process for calculating the amount of image change of the image using at least one of the intermediate value, the maximum value, and the minimum value of the lengths of the plurality of the motion vectors that have been detected in the image.

14. The scene-change detecting device according to claim 11, wherein the group-based image-change detecting unit calculates a feature amount of an image that cannot be categorized into any of the motion patterns, thereby detecting the image change between the images.

15. The scene-change detecting device according to claim 9, wherein the group-based image-change detecting unit detects the image change between the images by taking a degree of reliability of the plurality of the motion vectors that have been detected in the image into consideration.

16. The scene-change detecting device according to claim 9, wherein the group-based scene-change detecting unit detects the scene change in each of the pattern groups by taking a degree of reliability that is defined for each of the pattern groups into consideration.

17. The scene-change detecting device according to claim 1, further comprising a scene-change-position detecting unit that detects a scene change position in the image sequence on the basis of the scene change that has been detected in each of the pattern groups.

18. The scene-change detecting device according to claim 1, wherein the image sequence is an image sequence of in-vivo images taken by a capsule endoscope introduced inside the body cavity of a subject.

19. A computer-readable storage medium that stores therein a scene-change detection program, the scene-change detection program including instructions for causing a computer to execute:
detecting motion vectors between an image and another image at a plurality of positions on the image, the image being at least a part of a plurality of images making up an image sequence;
categorizing the images into pattern groups each indicating a predetermined motion pattern, on the basis of the plurality of the motion vectors detected in the image;
detecting an image change between the images in each of the pattern groups cateorized in the step of categorizing the images; and
detecting scene change in each of the pattern groups categorized in the step of categorizing the images, on the basis of the image change detected in the step of detecting the image change.

20. A scene-change detecting method that comprising:
detecting motion vectors between an image and another image at a plurality of positions on the image, the image being at least a part of a plurality of images making up an image sequence;
categorizing the images into pattern groups each indicating a predetermined motion pattern, on the basis of the plurality of the motion vectors detected in the image;
detecting an image change between the images in each of the pattern groups categorized in the step of categorizing the images; and
detecting scene change in each of the pattern groups categorized in the step of categorizing the images, on the basis of the image change detected in the step of detecting the image change.

* * * * *